US009704016B2

(12) United States Patent
Jang et al.

(10) Patent No.: US 9,704,016 B2
(45) Date of Patent: Jul. 11, 2017

(54) DISPLAY DEVICE, SERVER, AND METHOD OF CONTROLLING THE DISPLAY DEVICE

(71) Applicant: SAMSUNG ELECTRONICS CO., LTD., Suwon-si (KR)

(72) Inventors: Jae-seok Jang, Changwon-si (KR); Tae-ung Jung, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 141 days.

(21) Appl. No.: 14/571,478

(22) Filed: Dec. 16, 2014

(65) Prior Publication Data
US 2015/0254497 A1 Sep. 10, 2015

(30) Foreign Application Priority Data

Mar. 5, 2014 (KR) ........................ 10-2014-0026141

(51) Int. Cl.
| | |
|---|---|
| *G06K 9/00* | (2006.01) |
| *G06F 17/30* | (2006.01) |
| *G06K 9/62* | (2006.01) |
| *H04N 5/50* | (2006.01) |

(Continued)

(52) U.S. Cl.
CPC ..... *G06K 9/00087* (2013.01); *G06F 17/3028* (2013.01); *G06K 9/6201* (2013.01);
(Continued)

(58) Field of Classification Search
CPC .............. G06K 9/00087; G06K 9/6201; G06F 17/3028; H04N 5/50; H04N 21/4722;
(Continued)

(56) References Cited

U.S. PATENT DOCUMENTS

| | | | |
|---|---|---|---|
| 8,219,911 B2* | 7/2012 | Clarke-Martin ....... | G06Q 30/02 707/705 |
| 2006/0179453 A1* | 8/2006 | Kadie .................... | G06Q 30/02 725/34 |

(Continued)

FOREIGN PATENT DOCUMENTS

| | | |
|---|---|---|
| EP | 2800392 A1 | 11/2014 |
| WO | 2013119082 A1 | 8/2013 |
| WO | 2014014252 A1 | 1/2014 |

OTHER PUBLICATIONS

Communication dated Jun. 8, 2015, issued by the European Patent Office in counterpart European Patent Application No. 15151343.9.

*Primary Examiner* — Jon Chang
(74) *Attorney, Agent, or Firm* — Sughrue Mion, PLLC (57) ABSTRACT

A display device is provided. The display device includes an outputter configured to output a content including a plurality of content parts, a signal processor configured to extract a first fingerprint corresponding to a first content part among the plurality of content parts of the content from at least one of a video signal and an audio signal constituting the content while the content is output, a communicator configured to transmit the first fingerprint to a server, and receive a second fingerprint corresponding to a second content part among the plurality of content parts of the content and first event information corresponding to the second fingerprint from the server, a storage configured to store the second fingerprint and the first event information, and a controller configured to control the outputter to output the first event information in coordination with the second content part of the content being output.

17 Claims, 8 Drawing Sheets

(51) Int. Cl.
   *H04N 21/44*    (2011.01)
   *H04N 21/439*   (2011.01)
   *H04N 21/4722*  (2011.01)
   *H04N 21/434*   (2011.01)
   *H04N 21/6547*  (2011.01)
   *H04N 21/658*   (2011.01)

(52) U.S. Cl.
   CPC ........... *H04N 5/50* (2013.01); *H04N 21/4348* (2013.01); *H04N 21/4394* (2013.01); *H04N 21/44008* (2013.01); *H04N 21/4722* (2013.01); *H04N 21/6547* (2013.01); *H04N 21/6582* (2013.01)

(58) Field of Classification Search
   CPC ........... H04N 21/4348; H04N 21/6547; H04N 21/4394; H04N 21/44008; H04N 21/812
   USPC .......................................................... 725/32
   See application file for complete search history.

(56) References Cited

U.S. PATENT DOCUMENTS

| | | | |
|---|---|---|---|
| 2010/0122279 A1* | 5/2010 | Zhang | H04H 60/59 725/19 |
| 2010/0217671 A1* | 8/2010 | Lee | G06Q 30/02 705/14.53 |
| 2010/0262488 A1* | 10/2010 | Harrison | G06Q 30/02 705/14.46 |
| 2012/0008821 A1* | 1/2012 | Sharon | G06K 9/00744 382/100 |
| 2013/0291008 A1* | 10/2013 | Abed | H04N 7/0882 725/32 |
| 2013/0346631 A1 | 12/2013 | Gandhi et al. | |
| 2015/0020094 A1 | 1/2015 | Moon et al. | |
| 2015/0365709 A1* | 12/2015 | Cho | H04N 21/25891 725/13 |

* cited by examiner

DISPLAY DEVICE, SERVER, AND METHOD OF CONTROLLING THE DISPLAY DEVICE

CROSS-REFERENCE TO RELATED APPLICATION

This application claims priority from Korean Patent Application No. 10-2014-0026141, filed on Mar. 5, 2014, in the Korean Intellectual Property Office, the disclosure of which is incorporated herein by reference in its entirety.

BACKGROUND

1. Field

Apparatuses and methods consistent with exemplary embodiments relate to a display device, a server, and a method of providing event information of a display device.

2. Description of the Related Art

As needs of a user become increasingly diversified, a source of broadcasting content or multimedia content changing from a public television (TV)-centered signal source to various sources such as a cable, an internet protocol TV (IPTV), or video on demand (VOD). As an example, sources which provide event information such as customized advertisements or program recommendations have occurred.

The event information has to be appropriately provided according to a displayed screen. For example, it is most effective to display an advertising message for a specific product in response to a screen being displayed which reveals the product.

However, it is difficult to appropriately provide event information in the related device. That is, in the related art, a fingerprint extracted from content which is being viewed is transmitted to a server, and the server transmits identification information of the content, and a media time in which the event information is to be output to a television (TV). For example, the server notifies the TV of whether to output the event information from a currently identified content part after a few seconds.

Accordingly, in related art, a time delay due to a communication environment between the TV and the server occurs. Further, when stop and rewind operations are made by a user, the TV does not recognize that the content stops or the content rewinds. Accordingly, until the TV receives a new media time, the TV recognizes that the content is output continuously, and thus, the TV may output event information at a wrong time. Therefore, it is difficult to appropriately provide the event information.

SUMMARY

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide a display device capable of outputting event information at appropriate times using a fingerprint, a method of providing event information of the display device, and a server communicating with the display device.

According to an aspect of an exemplary embodiment, there is provided a display device. The display device may include: an outputter configured to output a content including a plurality of content parts; a signal processor configured to extract a first fingerprint corresponding to a first content part among the plurality of content parts of the content from at least one of a video signal and an audio signal constituting the content while the content is output; a communicator configured to transmit the first fingerprint to a server, and receive a second fingerprint corresponding to a second content part among the plurality of content parts of the content and first event information corresponding to the second fingerprint from the server; a storage configured to store the second fingerprint and the first event information; and a controller configured to control the outputter to output the first event information in coordination with the second content part of the content being output.

The controller may analyze the plurality of content parts of the content, and control the outputter to output the first event information at a time corresponding to the second content part corresponding to the second fingerprint being output.

The controller may transmit content identification information including electronic program guide (EPG) information to the server instead of the first fingerprint in response to the EPG information being included in the content.

The first fingerprint or the second fingerprint may include at least one selected from among a video frame, edge information of an object included in the video frame, caption information included in the video frame, logo information, frequency information of a specific period in the audio signal, and audio signal peak information over the specific period in the audio signal.

The first event information may include at least one selected from among shopping information related to the content, channel recommendation information related to the content, broadcasting schedule information related to the content, and comment collection information related to the content.

The controller may, in response to an occurrence of at least one event from among a first event in which the content is changed, a second event in which a preset time period arrives, a third event in which a source providing the content is changed, a fourth event in which a user command is input, a fifth event in which a fingerprint transmission request is received from the server, and a sixth event in which the content is completed, extract the first fingerprint, and control the communicator to transmit the extracted first fingerprint to the server.

The communicator may be further configured to receive a third fingerprint corresponding to a third content part among the plurality of content parts of the content and second event information corresponding to the third fingerprint from the server. The controller may be further configured to analyze the plurality of content parts of the content, and to control the outputter to output the second event information in coordination with the third content part corresponding to the third fingerprint being output.

The second and third fingerprints may be received in a list form.

According to an aspect of an exemplary embodiment, there is provided a server. The server may include: a communicator configured to communicate with a display device which displays a content including a plurality of content parts; a controller configured to, in response to a first fingerprint corresponding to a first content part among the plurality of content parts of the content being received from the display device, control the communicator to transmit a second fingerprint corresponding to a second content part among the plurality of content parts of the content and first event information corresponding to the second fingerprint to the display device; and a storage configured to store a fingerprint data base including the second fingerprint.

The controller may, in response to the second and a third fingerprint corresponding to a third content part among the plurality of content parts of the content being stored in the storage, control the communicator to transmit the third fingerprint and a second event information corresponding to the third fingerprint to the display device.

The controller may control the communicator to transmit the second fingerprint and the first event information to the display device in response to content identification information included in an electronic program guide (EPG) information corresponding to the content being received from the display device.

According to an aspect of an exemplary embodiment, there is provided a method of providing event information of a display device. The method may include: outputting a content including a plurality of content parts; extracting a first fingerprint from at least one of a video signal and an audio signal corresponding to a first content part among the plurality of content parts of the content; transmitting the first fingerprint to a server; receiving a second fingerprint corresponding to a second content part among the plurality of content parts of the content and first event information corresponding to the second fingerprint; analyzing the content; and outputting the first event information in coordination with the second content part of the content being output.

The outputting the first event information may include analyzing the plurality of content parts of the content, and outputting the first event information in coordination with the second content part corresponding to the second fingerprint being output.

The extracting of the first fingerprint may include extracting the first fingerprint in response to an electronic program guide (EPG) information being not included in the content, and extracting identification information of the content included in the EPG information in response to the EPG information being included in the content. The transmitting may include, in response to the EPG information being included in the content, the first fingerprint and transmitting the identification information of the content instead of the first fingerprint to the server.

The first fingerprint or the second fingerprint may include at least one selected from among a video frame, edge information of an object included in the video frame, caption information included in the video frame, logo information, frequency information of a specific period in the audio signal, and audio signal peak information over the specific period in the audio signal.

The first event information may include at least one selected from among shopping information related to the content, channel recommendation information related to the content, broadcasting schedule information related to the content, and comment collection information related to the content.

The extracting of the first fingerprint may include extracting, in response to an occurrence of at least one event from among a first event in which the content is changed, a second event in which a preset time period arrives, a third event in which a source providing the content is changed, a fourth event in which a user command is input, a fifth event in which a fingerprint transmission request is received from the server, and a sixth event in which the content is completed, the first fingerprint.

The method may further include receiving a third fingerprint corresponding to a third content part among the plurality of content parts of the content and second event information corresponding to the third fingerprint; and outputting the second event information in coordination with the third content part corresponding to the third fingerprint being output.

The second and third fingerprints may be received in a list form.

According to an aspect of an exemplary embodiment, there is provided a display device. The display device may include: a display configured to display a content including a plurality of content parts; a signal processor configured to extract a content information corresponding to the content; a communicator configured to transmit the content information to a server, and receive a plurality of fingerprints corresponding to a plurality of respective event-triggering content parts among the plurality of content parts of the content and a plurality of event information respectively corresponding to the plurality of fingerprints; a storage configured to store the plurality of fingerprints and the plurality of event information; and a controller configured to, in response to a currently displayed content part among the plurality of content parts of the content being displayed on the display corresponding to a first event-triggering content part among the plurality of event-triggering content parts corresponding, the first event-triggering content part corresponding to a first fingerprint among the plurality of fingerprints, control the display to display an event corresponding to a first event information among the plurality of event information corresponding to the first fingerprint.

The controller may be further configured to analyze the content to determine whether the currently displayed content part corresponds to the first event-triggering content part.

The controller may be further configured to compare a current content fingerprint corresponding to the currently displayed content part of the content to the plurality of fingerprints and to determine, in response to a result of the comparison indicating that the current content fingerprint matches the first fingerprint, that the currently displayed content part corresponds to the first event-triggering content part.

The controller may be further configured to extract the current content fingerprint from the currently displayed content part of the content.

The signal processor may be further configured to derive the content information from an electronic program guide (EPG) information included in the content.

The signal processor may be further configured to derive the content information from a content part among the plurality of content parts of the content.

Additional aspects and advantages of one or more exemplary embodiments will be set forth in the detailed description, will be obvious from the detailed description, or may be learned by practicing one or more exemplary embodiments.

BRIEF DESCRIPTION OF THE DRAWING FIGURES

The above and/or other aspects will be more apparent by describing in detail exemplary embodiments, with reference to the accompanying drawings, in which.

DETAILED DESCRIPTION OF THE EXEMPLARY EMBODIMENTS

Hereinafter, one or more exemplary embodiments will be described in more detail with reference to the accompanying drawings.

In the following description, same reference numerals are used for the same elements when they are depicted in different drawings. The matters defined in the description, such as detailed construction and elements, are provided to assist in a comprehensive understanding of the exemplary embodiments. Thus, it is apparent that the exemplary embodiments can be carried out without those specifically defined matters. Also, functions or elements known in the related art are not described in detail since they would obscure the exemplary embodiments with unnecessary detail.

Figure 1:
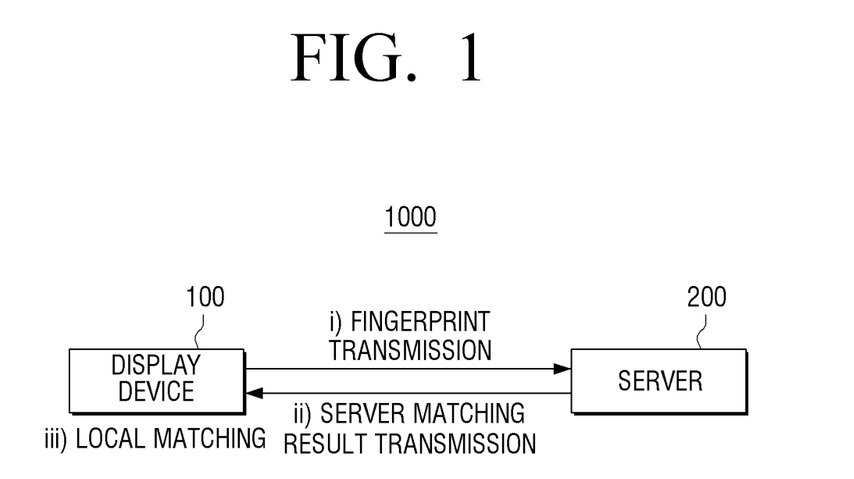
FIG. 1 is a view illustrating a content-customized service providing system according to an exemplary embodiment.

FIG. 1 is a schematic view illustrating a content-customized service providing system 1000 according to an exemplary embodiment. As illustrated in FIG. 1, the content-customized service providing system 1000 includes a display device 100 and a server 200.

The display device 100 is a device which receives a broadcast signal, and outputs the received broadcast signal. The display device 100 receives various types of broadcast signals such as terrestrial broadcasting, cable broadcasting, satellite broadcasting, or Internet broadcasting. The display device 100 performs signal processing on content to be viewed by a user, and outputs the signal-processed content.

While the content is output, the display device 100 may extract a fingerprint from at least one of a video signal and an audio signal constituting the content.

The fingerprint means feature data representing a feature such as an audio signal, an image signal, or a video signal, and reflects an inherent feature of a signal itself differently from meta data based on text. Therefore, the fingerprint is referred to as fingerprint data, deoxyribonucleic acid (DNA) data, or gene data. For example, for an audio signal, the fingerprint is feature data such as a frequency or amplitude of the audio signal. For an image signal or the video signal, the fingerprint is feature data such as a video frame, a motion vector of the video frame, or color information.

The server 200 may communicate with a display device 100 through a network such as the Internet, a cable, or a satellite. In particular, the server 200 may perform server matching which analyzes information for content transmitted from the display device 100, recognizes content which is being currently viewed by the user, and, specifically, recognizes a part of the content which is being viewed.

In response to a service to be provided to the user in a content part of the currently viewed content, the server 200 transmits event information for the service to the display device 100, and simultaneously also transmits a fingerprint for the content part in which the event information is to be displayed to the display device 100.

The display device 100 performs local matching that analyzes whether or not the fingerprint transmitted from the server 200 coincides with the fingerprint of each part of the content part currently viewed by the user, and outputs the event information at a point of time when the fingerprint of the currently viewed content part coincides with the transmitted fingerprint.

According to the above-described content-customized service providing system 1000, since the event information is provided to the user only by performing the local matching using the fingerprint, it is not necessary to periodically perform an event information request to the server 200. Therefore, an amount of data transmission between the display device 100 and the server 200 may be drastically reduced.

Further, in response to an operation such as stop, rewind, or fast forward being performed in the display device 100 while the content is output, the server 200 may not detect variables which may occur in the display device 100. Thus, an error may inevitably occur to recognize a content part, which is actually being output, only through the server matching method. However, the content-customized service providing system 1000 is based on the local matching method and may supplementarily use the server matching method, and thus an error is not likely to occur.

Hereinafter, the display device 100 and the server 200 will be described in more detail with reference to FIGS. 2 and 3.

Figure 2:
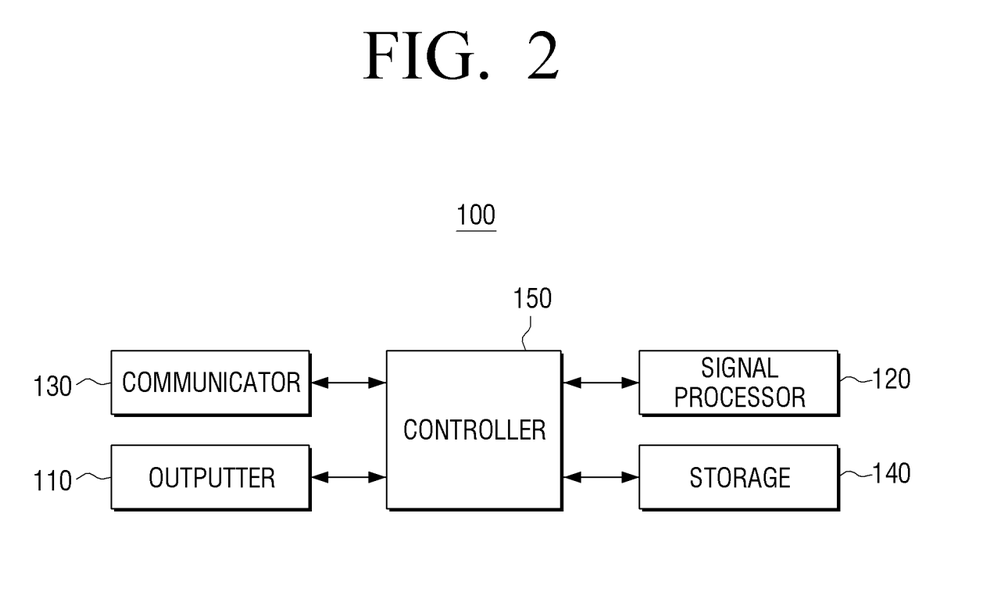
FIG. 2 is a block diagram illustrating a display device according to an exemplary embodiment.

FIG. 2 is a block diagram illustrating the display device 100 according to an exemplary embodiment. As illustrated in FIG. 2, the display device 100 includes an outputter 110, i.e. an output unit, a signal processor 120, a communicator 130, i.e. a communication unit, a storage 140, i.e. a storage unit, and a controller 150.

The outputter 110 is configured to display content according to a video signal constituting content or output sound according to an audio signal constituting the content. For example, the outputter 110 may be implemented with a monitor, a screen, a speaker, a beam projector, or the like.

The signal processor 120 may extract a fingerprint from at least one of the video signal and the audio signal constituting the content while the content is output from the outputter 110.

According to an exemplary embodiment, the fingerprint may include at least one of a video frame, edge information of an object included in the video frame, caption information included in the video frame, logo information, frequency information of a specific period in the audio signal, and audio signal peak information over the specific period in the audio signal.

The signal processor 120 may extract the fingerprint using various methods. According to an exemplary embodiment, the signal processor 120 divides the audio signal at certain time intervals, and calculates magnitudes of signals of frequencies included in the time intervals. The signal processor 120 may calculate a magnitude difference between signals of adjacent frequency periods to calculate a frequency slope, perform quantization on a negative frequency slope to 1 and a positive frequency slope to 0 (zero), and generate fingerprint data. Further, the signal processor 120 may generate a fingerprint for the video signal using edge information of an object included in a plurality of frames constituting the video signal, a motion vector, color information, or the like.

The communicator 130 is connected to the server 200 through a network, and transmits and receives various types of data. In particular, the communicator 130 may transmit a first fingerprint to the server 200. Here, the first fingerprint means a fingerprint transmitted from the display device 100 to the server 200 among fingerprints transmitted between the display device 100 and the server 200.

The communicator 130 may receive a second fingerprint and event information matching the second fingerprint from the server 200.

Here, the second fingerprint is a fingerprint for a content part in which service is to be output in a part subsequent to a content part corresponding to the first fingerprint existing.

Further, the communicator 130 may receive a plurality of second fingerprints according to the number of pieces of event information to be output. The plurality of second fingerprints and the pieces of event information matching the plurality of second fingerprints may be received in a list form.

The storage 140 may store various types of data or the like required to operate the display device 100. In particular, the storage 140 may store the second fingerprint and the event information matching the second fingerprint received from the server 200.

The controller 150 is configured to generally control the display device 100.

In particular, the controller 150 may extract the first fingerprint and transmit the first fingerprint to the server 200. Specifically, the controller 150 may not extract the first fingerprint every frame and transmit the first fingerprint to the server 200 but may control the signal processor 120 to extract the first fingerprint only in response to an occurrence of a specific event. For example, in response to an occurrence of an event in which content is changed, an event in which a preset time period arrives, an event in which a source providing content is changed, an event in which a user command is input, an event in which a fingerprint transmission request is received from the server 200, an event in which a last part of content is recognized, or the like, the controller may control the signal processor 120 to extract the first fingerprint.

The event in which the last part of the content is recognized may occur by detecting a fingerprint for the last part of the content received from the server 200. An advertisement is mostly output between the completion of the content and the output of next content, and thus the controller 150 may periodically extract the first fingerprint, and transmit the extracted first fingerprint to the server 200 until the content is output. In response to the second fingerprint and the event information being transmitted from the server 200 to the display device as a recognition result of the new content, the controller 150 stops the extraction of the first fingerprint, and performs local matching using the second fingerprint.

In response to electronic program (EPG) information being included in content, the controller 150 may transmit identification information of the content included in the EPG information other than the first fingerprint to the server. The EPG information is included in a broadcast signal and transmitted to the display device. The EPG information includes identification information for broadcasting. The signal processor 120 may separately separate the EPG information from the received broadcast signal, and allow the EPG information to be viewed to the user in a TV channel guide list form in response to a request of the user.

The controller 150 may control the signal processor 120 to extract a fingerprint corresponding to every part of content output from the outputter 110 after the second fingerprint and the event information matching the second fingerprint are received from the server 200. As a non-limiting example, the part of the content means every video frame unit constituting the content.

The controller 150 may perform local matching which analyzes whether or not the extracted fingerprint coincides with the second fingerprint received from the server 200, and outputs the event information matching the second fingerprint in a content part which coincides with the second fingerprint.

The output event information may include shopping information related to a specific part of the content, recommendation information for a channel of other content related to the content, comment collection information for receiving a comment of the user for the content, or the like. The event information may be output in a pop-up form in a lower end of a screen of the display device 100. The event information may be output in different display locations on the screen according to the content or the event information. The user may input a command for service execution through a user interface (UI) screen output together with the event information or input text.

Further, the controller 150 may control the storage 140 to delete the event information and the second fingerprint matching the event information when the event begins or finishes being output. Thus, a storage space of the storage 150 may be efficiently used.

According to an exemplary embodiment, in response to a list including a plurality of second fingerprints being received from the server 200, a fingerprint corresponding to a last part of the content may be included in the list. At this time, the controller 150 may recognize that the last part of the content is currently output from the outputter 110 using the fingerprint corresponding to the last part of the content. The controller 150 may extract the first fingerprint again, transmit the extracted first fingerprint to the server 200, and allow the server 200 to start the server matching.

The above-described display device 100 may provide a content-customized service based on information previously received from the server 200. Therefore, while the same content is reproduced, the display device 100 may not transmit a continuous query to the server 200 to request event information, and may transmit the query only in a state in which the content is changed or the content is completed, or the like, so that an amount of data transmission may be reduced.

In addition, the display device 100 may perform local matching based on the previously received information to identify a content part viewed by the user, and thus the display device may be able to adjust to various user operations such as stop, skip, rewind, fast forward, or the like during reproduction of the content. Therefore, an error which may occur by real-time server matching may be reduced.

Figure 3:
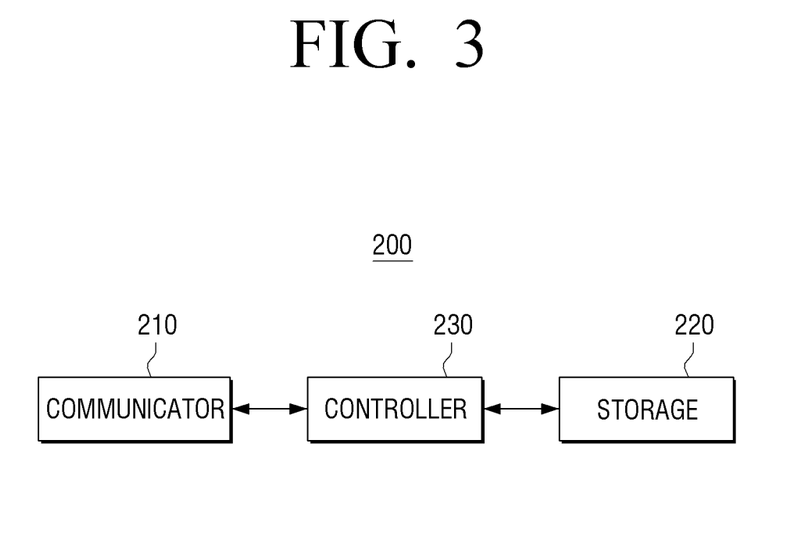
FIG. 3 is a block diagram illustrating a server according to an exemplary embodiment.

FIG. 3 is a block diagram illustrating the server 200 according to an exemplary embodiment. As illustrated in FIG. 3, the server 200 includes a communicator 210, i.e. a communication unit, a storage 220, i.e. a storage unit, and a controller 230.

The communicator 210 is connected to the display device 100, which displays content, through a network, and transmits and receives various types of data.

In particular, the communicator 210 may receive a first fingerprint extracted from at least one of a video signal and an audio signal constituting content from the display device 100. Here, the first fingerprint means a fingerprint transmitted from the display device 100 to the server 200 among fingerprints transmitted between the display device 100 and the server 200. The first fingerprint may correspond to an arbitrary part of the content being displayed.

The communicator 210 may transmit a second fingerprint and event information matching the second fingerprint to the display device 100. Here, the second fingerprint is a fingerprint for a content part subsequent to a content part corresponding to the first fingerprint during which a service is to be output.

Further, the communicator 210 may transmit a plurality of second fingerprints according to the number of services to be provided in a specific content. At this time, the communicator 210 may transmit the plurality of second fingerprints and pieces of event information matching the plurality of second fingerprints to the display device 100 in a list form. The list may include a fingerprint corresponding to a last part of the content.

The storage 220 may store various types of data required to operate the server 200. In particular, the storage 220 may store fingerprints data-based according to content, and portions of the fingerprints may match event information.

According to an exemplary embodiment, the server 200 may receive a fingerprint and event information matching the fingerprint from a content provider, and store the fingerprint and the event information in the storage 220.

The controller 230 is configured to generally control the server 200.

In particular, the controller 230 may start server matching in response to receiving the first fingerprint extracted from at least one of the video signal and the audio signal constituting the content, which is being output from the display device 100. The controller 230 may transmit the second fingerprint for the content and the event information matching the second fingerprint through the server matching to the display device 100.

Specifically, the controller 230 inquires whether or not the first fingerprint is included in a fingerprint data base, recognizes a content part, which is being currently output from the display device 100, and checks whether or not event information exists for parts subsequent to the recognized content part. The controller 230 transmits the event information and the second fingerprint corresponding to the event information to the display device 100.

The event information may include information for advertising purposes such as shopping information related to a specific part of the content, recommendation information for a channel of other content related to output the content, comment collection information for receiving a comment of the user for content, or the like.

The controller 230 may transmit the second fingerprint for the content and the event information matching the second fingerprint to the display device in response to the content identification information included in an EPG information of the content being received from the display device. Specifically, the controller 230 may analyze the received content identification information, identify the content which is being currently output by the device display 100, inquire about the second fingerprint for the corresponding content and the event information, and transmit the result of the inquiring to the display device 100.

The controller 230 may generate a plurality of second fingerprints and pieces of event information matching the plurality of second fingerprints in a list form, and a fingerprint corresponding to a last part of the content may also be included in the list and transmitted to the display device 100. At this time, the display device 100 may recognize whether or not the last part of the content is output using the received list, and then the display device 100 may periodically extract a new first fingerprint for content which is being newly output, and transmit the new first fingerprint to the server 200. The server 200 which receives the new first fingerprint begins server matching again.

As described above, after all event information for the content, which is being currently output in the display device 100, is transmitted together with the fingerprint from the server 200, it is not necessary for the server 200 to perform a separate operation until output of new content is recognized. Therefore, an amount of data transmission to the display device 100 may be reduced.

Further, after a fingerprint for a content part in which an event is to be output is also transmitted to the display device 100 from the server 200, the display device 100 may perform local matching itself, and thus a concern about an event output time delay which may occur in data exchange may be reduced.

Figure 4:
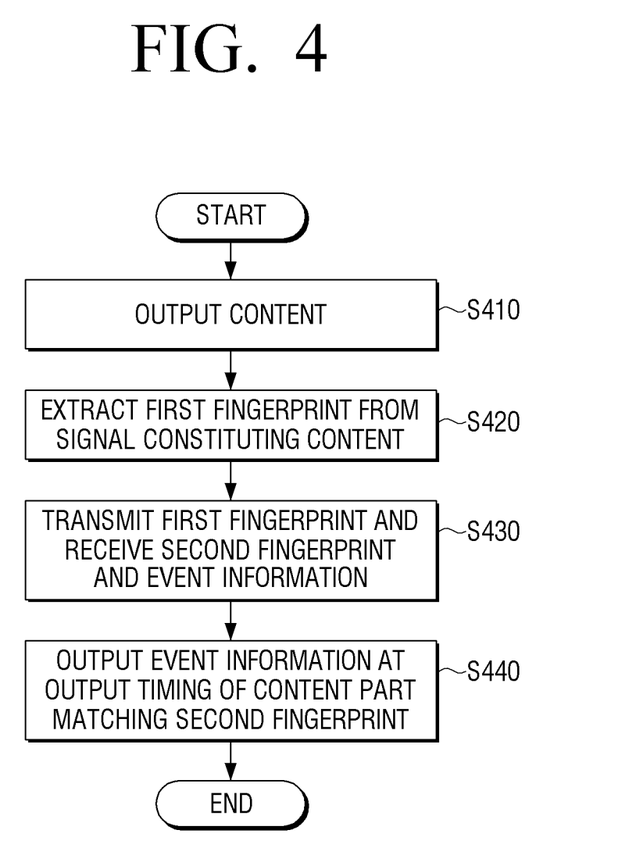
FIG. 4 is a flowchart illustrating a method of providing event information of a display device according to an exemplary embodiment.

FIG. 4 is a flowchart illustrating a method of providing event information of a display device according to an exemplary embodiment.

The display device 100 receives content through various input sources. Input sources such as terrestrial broadcasting, satellite broadcasting, cable broadcasting, or Internet broadcasting as well as an IPTV or VOD may be included in the various input sources.

The display device 100 outputs the received content (S410).

While the content is output, the display device 100 extracts a first fingerprint from at least one of a video signal and an audio signal constituting the content (S420). For example, in response to occurrence of at least one event among an event in which content is changed, an event in which a preset time period arrives, an event in which a source providing content is changed, an event in which a user command is input, an event in which a fingerprint transmission request is received from the server 200, and an event in which content is completed, and the like, the first fingerprint may be extracted. The first fingerprint may correspond to an arbitrary portion of the content.

The display device 100 transmits the extracted first fingerprint to the server, and receives a second fingerprint for the content and event information matching the second fingerprint (S430).

The display device 100 receives the event information and the second fingerprint, analyzes content currently output from the display device 100, and outputs the event information at output timing of a content part matching the second fingerprint (S440).

According to another exemplary embodiment, the display device 100 may receive list information for a plurality of second fingerprints and pieces of event information matching the plurality of second fingerprints, and the display device 100 may analyze each part of the currently output content part, and output the pieces of event information matching the second fingerprints whenever the plurality of second fingerprints are detected.

Figure 5:
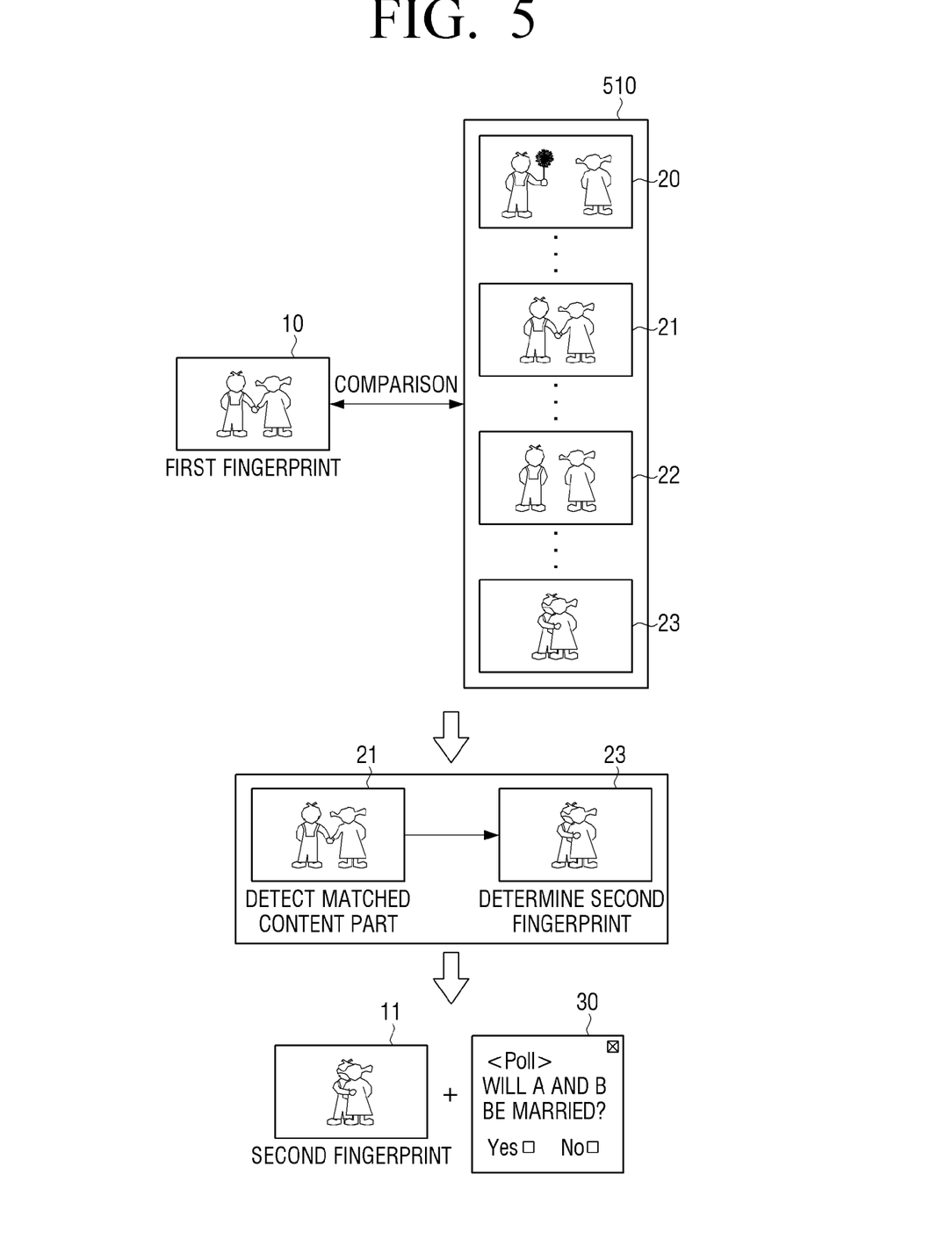
FIGS. 5 and 6 are views explaining a method of providing content-customized service according to an exemplary embodiment.

FIG. 5 is a view illustrating a method of providing content-customized service according to an exemplary embodiment.

Referring to FIG. 5, the display device 100 extracts a first fingerprint corresponding to a first content part 10 while content is output.

The extracted first fingerprint is transmitted to the server 200, and a fingerprint data base 510 for a plurality of content parts 20, 21, 22, and 23 are stored in the server 200.

The server 200 queries the fingerprint data base 510 to detect the content part 21 matching the first fingerprint, recognizes a content part currently output from the display device 100, and checks whether or not event information to be output in a subsequent event exists.

In response to the event information to be output existing, the server 200 determines a second fingerprint 11 for the content part 23 matching the event information 30. Then, the server 200 transmits the second fingerprint 11 and event information 30 to the display device 100. Hereinafter, output of the event information will be described in more detail with reference to FIG. 6.

Figure 6:
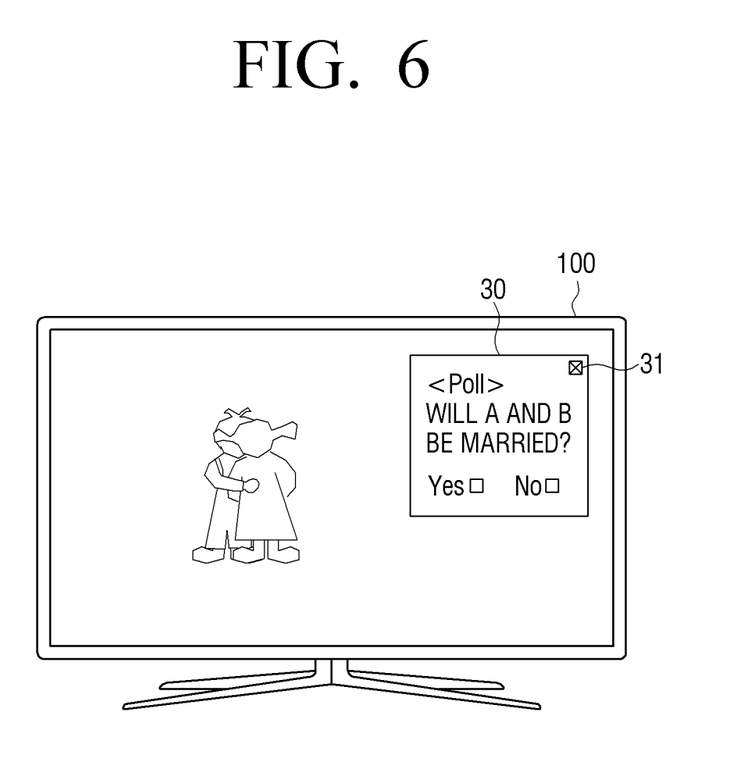

Referring to FIG. 6, the display device 100 receives the second fingerprint and the event information 30, and also outputs the event information 30 in response to the content part corresponding to the second fingerprint being output. As a non-limiting example, the event information 30 may be output in a UI screen for receiving selection of the user. The event information 30 may include duration time information which determines a display duration of the corresponding content part in the display device 100 even after the corresponding content part is passed.

The user may respond to the output event information using an input device such as a remote controller, or may select a delete button 31 in a case where the user does not want to receive the event information 30 anymore.

Figure 7:
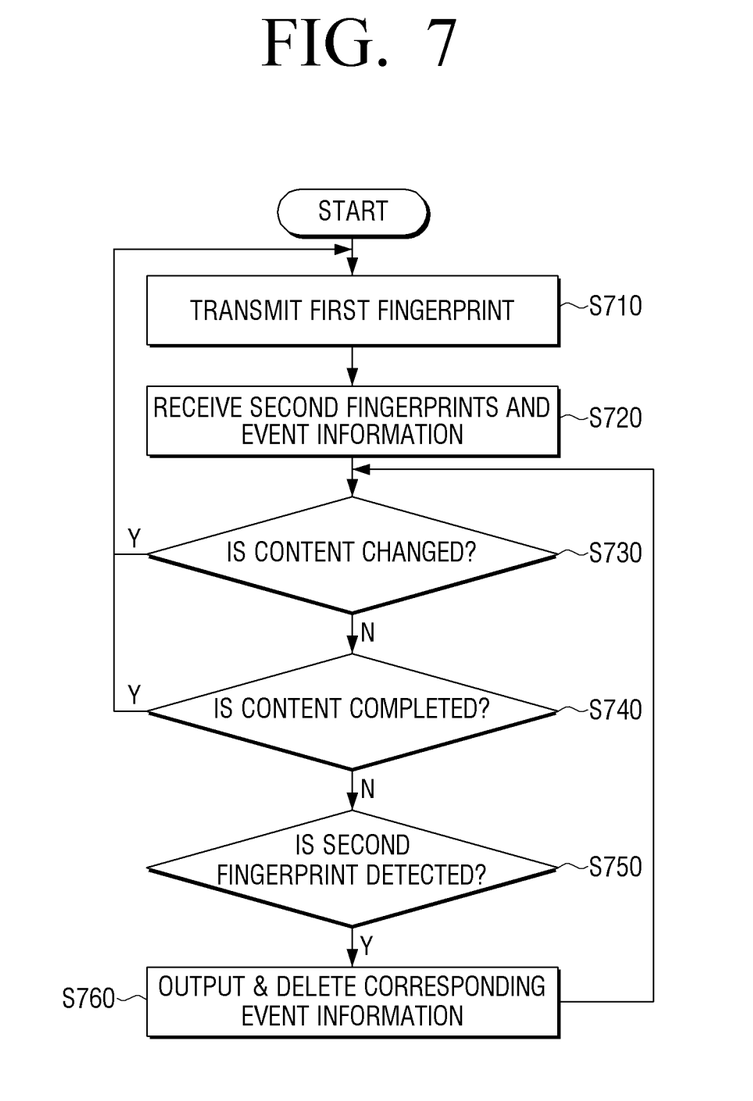
FIG. 7 is a flowchart illustrating a method of providing event information of a display device according to another exemplary embodiment.

FIG. 7 is a flowchart illustrating a method of providing event information of the display device according to another exemplary embodiment.

First, while content is output, the display device 100 extracts a first fingerprint from at least one of a video signal and an audio signal constituting content, and transmits the first fingerprint to the server 200 (S710).

The display device 100 receives at least one event information related to content currently output from the server 200 and at least one second fingerprints matching the at least one event information (S720).

The display device 100 determines whether or not the output content is changed (S730). Specifically, the display device 100 may determine whether or not the content is changed by recognizing a user input for content change, or by recognizing whether or not a source from which content is input is changed. As a determination result, in response to the content being changed, the display device 100 extracts the first fingerprint for the changed content again, and transmits the newly extracted first fingerprint to the server 200.

In response to the content not being changed, the display device 100 determines whether or not the content is completed (S740). Specifically, the display device 100 may also receive a fingerprint for a last part of the content from the server 200, and determine whether or not the last part of the content is being currently output using the fingerprint for the last part. The fingerprint for the last part of the content may be transmitted in a list form together with the event information and the second fingerprint.

In response to determining that the content is completed, the display device 100 extracts a first fingerprint again, and transmits the extracted first fingerprint to the server 200. In response to determining that the content is not completed, the display device 100 may perform local matching using the second fingerprint.

The display device 100 determines whether or not the second fingerprint is detected (S750). Specifically, the display device 100 extracts a fingerprint corresponding to every part of currently output content, and compares the extracted fingerprint with the second fingerprint.

In response to a fingerprint which coincides with the second fingerprint being extracted, the display device outputs corresponding event information, and simultaneously deletes the event information in the storage 140 (S760). Then, the display device 100 repeatedly performs the above-described process with respect to the remaining second fingerprints.

Figure 8:
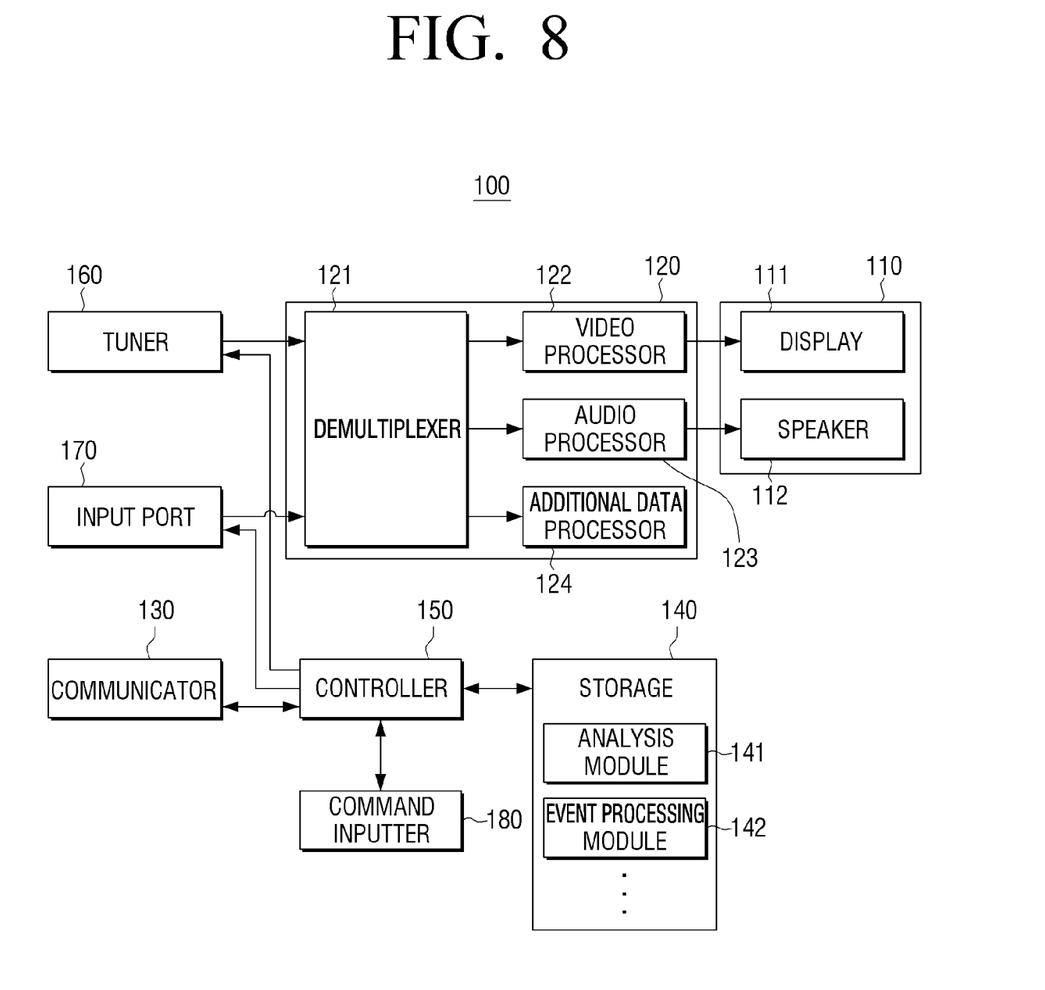
FIG. 8 is a detailed block diagram illustrating a display device according to an exemplary embodiment.

FIG. 8 is a block diagram illustrating a display device 100 in more detail according to an exemplary embodiment.

Referring to FIG. 8, the display device 100 includes a tuner 160, i.e. a tuner unit, an input port 170, a command inputter 180, i.e. a command input unit, a signal processor 120, an outputter 110, i.e. an output unit, a communicator 130, i.e. a communication unit, a storage 140, i.e. a storage unit, and a controller 150.

The tuner 160 receives a broadcast signal of a channel selected by the user among a plurality of broadcasting channels which are received through a satellite reception antenna, a terrestrial reception antenna, a cable, or the like and demodulates the broadcast signal, according to a tuning control signal of the controller 150.

The input port 170 may perform communication with various types of external devices, and receive content. The input port may include a universal serial bus (USB) port, a settop box port, a digital versatile disc (DVD) port, or the like.

The signal processor 120 may include a demultiplexer 121, a video processor 122, an audio processor 123, and an additional data processor 124.

The demultiplexer 121 performs demultiplexing on video data, audio data, and additional data included in content output through the tuner 160 or the input port 170, and provides the demultiplexing result to the audio processor 123, the video processor 122, or the additional data processor 124.

The additional data processor 124 may process the additional data separated by the demultiplexer 121 and add a processed caption, or the like to a corresponding image frame, in response to additional information such as an EPG information and a caption being included in the content.

The video processor 122 decodes the video data separated through the demultiplexer 121, and then performs signal processing to have a vertical frequency, resolution, an aspect ratio, and the like which meet an output standard of the display 111, i.e. a display unit. Further, the video processor 122 scales a user interface and video data, and outputs the scaling result so that the user interface including event information received from the server 200 is displayed in the display 111 together with the video data.

The video processor 122 may extract a fingerprint which is feature information from a video signal constituting content.

The display 111 outputs the video data and the user interface output from the video processor 122 in an image form.

The audio processor 123 decodes the audio data provided from the demultiplexer 121, and then performs signal processing to meet an output standard of a speaker 112 and outputs the signal processing result.

Further, the audio processor 123 may extract a fingerprint which is feature information from an input audio signal.

The communicator 130 communicates with a broadcast server or the server 200 through a network, such as the Internet, and receives various pieces of service. That is, the communicator 130 requests service required by the user through the Internet, and receives the service transmitted from the outside.

The command inputter 180 includes various types of keys configured to receive a user command, and includes an infrared reception unit configured to receive the user command transmitted from a remote control device (not shown). Alternatively, the command inputter 180 may be coupled to the display 111, and be implemented with a touch panel method. The user command received through the command inputter 180 is converted into a corresponding key signal, and the key signal is transmitted to the controller 150.

The storage 140 stores various types of programs and data required to perform an operation of the display device 100. Further, the storage 140 stores the fingerprint of the video signal or the audio signal extracted from the signal processor 120, and a fingerprint and event information received from the server 200.

The storage 140 includes an analysis module 141 configured to compare and analyze the fingerprint extracted from the signal processor 120 and the fingerprint received from the server 200, and an event processing module 142 configured to output the event information received from the server 200 and process a user input for the event information.

The controller 150 controls the respective components of the display device 100. Specifically, the controller 150 may control the communicator 130 to transmit a first fingerprint extracted from the signal processor 120 to the server 200.

According to another embodiment, the controller 150 may control the communicator 130 to identify currently output content using an EPG information included in the content, and to transmit the content identification information to the server 200.

The controller 150 receives a response for the transmitted first fingerprint or content identification information from the server 200. The controller 150 compares the fingerprint received from the server 200 with a fingerprint of each part of the content output from the outputter 110, and outputs event information matching a corresponding fingerprint through the outputter 110 in response to the comparison result indicating that the fingerprint received from the server 200 matches a fingerprint of the output part of the content.

The event information providing method, the content-customized service providing method, or the like according to the above-described exemplary embodiments may be coded in software. The software may be stored in a non-transitory computer-readable medium, and used for devices such as a display device or a glasses device.

The non-transitory computer-readable medium is not a medium configured to temporarily store data such as a register, a cache, or a memory but an apparatus-readable medium configured to semi-permanently store data. Specifically, the above-mentioned various applications or programs may be stored in the non-transitory computer-readable medium such as a compact disc (CD), a DVD, a hard disc, a Blu-ray disc, a USB, a memory card, or a read only memory (ROM), and provided.

The foregoing exemplary embodiments and advantages are merely exemplary and are not to be construed as limiting the present inventive concept. The exemplary embodiments can be readily applied to other types of devices. Also, the description of the exemplary embodiments is intended to be illustrative, and not to limit the scope of the claims, and many alternatives, modifications, and variations will be apparent to those skilled in the art.

What is claimed is:

1. A display device comprising:
   a signal receiver configured to receive content signal comprising at least one of a video signal and an audio signal;
   an outputter configured to output an image based on the content signal;
   a signal processor configured to extract a fingerprint from the content signal while the image is output;
   a communicator configured to communicate with a server; and
   a controller configured
   to control the communicator to transmit a first fingerprint extracted via the signal processor from the content signal to the server,
   in response to transmitting the first fingerprint to the server, to receive a second fingerprint and event information associated with the second fingerprint from the server, and
   if a third fingerprint extracted via the signal processor from the content signal matches the second fingerprint received from the server, perform a process corresponding to the event information associated with the second fingerprint.

2. The display device as claimed in claim 1, wherein the controller is further configured to control the outputter to output an image corresponding to the event information at a time when it is determined that the third fingerprint matches the second fingerprint.

3. The display device as claimed in claim 1, wherein the controller is further configured to transmit content identification information comprising electronic program guide (EPG) information to the server instead of the first fingerprint in response to the EPG information being included in the content signal.

4. The display device as claimed in claim 1, wherein at least one of the first fingerprint or the second fingerprint includes at least one selected from among a video frame, edge information of an object included in the video frame, caption information included in the video frame, logo information, frequency information of a specific period in the audio signal, and audio signal peak information over the specific period in the audio signal.

5. The display device as claimed in claim 1, wherein the event information includes at least one selected from among shopping information, channel recommendation information, broadcasting schedule information, and comment collection information.

6. The display device as claimed in claim 1,
   wherein the communicator is further configured receive a fourth fingerprint and event information associated with the fourth fingerprint from the server, and
   wherein if a fifth fingerprint extracted via signal the processor from the content signal matches the fourth fingerprint received from the server, the controller is further configured to perform a process corresponding to the event information associated with the fourth fingerprint.

7. The display device as claimed in claim 6, wherein the second and fourth fingerprints are received in a list form.

8. A server comprising:
   a storage configured to store a plurality of fingerprints;
   a communicator configured to communicate with a display device which displays an image based on content signal comprising at least one of a video signal and an audio signal; and
   a controller configured, in response to a first fingerprint being received from the display device, to search a content part matching the first fingerprint, to control the communicator to transmit event information corresponding to the searched content part and a second fingerprint corresponding to the event information to the display device.

9. The server as claimed in claim 8, wherein at least one of the first fingerprint or the second fingerprint includes at least one selected from among a video frame, edge information of an object included in the video frame, caption information included in the video frame, logo information, frequency information of a specific period in the audio signal, and audio signal peak information over the specific period in the audio signal.

10. The server as claimed in claim 8, wherein the event information includes at least one selected from among shopping information, channel recommendation information, broadcasting schedule information, and comment collection information.

11. A method of providing event information of a display device, the method comprising:
receiving content signal comprising at least one of a video signal and an audio signal;
outputting an image based on the content signal;
extracting a fingerprint from the content signal while the image is output;
transmitting a first fingerprint extracted from the content signal to a server;
in response to transmitting the first fingerprint to the server, receiving a second fingerprint and event information associated with the second fingerprint from the server;
and
if a third fingerprint extracted from the content signal matches the second fingerprint received from the server, performing a process corresponding to the event information associated with the second fingerprint.

12. The method as claimed in claim 11, wherein the performing a process comprises outputting an image corresponding to the event information at a time when it is determined that the third fingerprint matches the second fingerprint.

13. The method as claimed in claim 11, wherein the extracting a fingerprint comprises extracting the first fingerprint in response to an electronic program guide (EPG) information being not included in the content, and extracting identification information of the content included in the EPG information in response to the EPG information being included in the content,
wherein the transmitting comprises, in response to the EPG information being included in the content, transmitting the identification information of the content instead of the first fingerprint to the server.

14. The method as claimed in claim 11, wherein at least one of the first fingerprint or the second fingerprint includes at least one selected from among a video frame, edge information of an object included in the video frame, caption information included in the video frame, logo information, frequency information of a specific period in the audio signal, and audio signal peak information over the specific period in the audio signal.

15. The method as claimed in claim 11, wherein the event information includes at least one selected from among shopping information, channel recommendation information, broadcasting schedule information, and comment collection information.

16. The method as claimed in claim 11, further comprising:
receiving a fourth fingerprint and event information associated with the fourth fingerprint from the server; and
if a fifth fingerprint extracted from the content signal matches the fourth fingerprint performing a process corresponding the event information associated with the fourth fingerprint.

17. The method as claimed in claim 16, wherein the second and fourth fingerprints are received in a list form.

* * * * *